United States Patent [19]
Hunter

[11] Patent Number: 4,514,380
[45] Date of Patent: Apr. 30, 1985

[54] METHOD OF PREPARING TETRARHODIUM DODECACARBONYL

[75] Inventor: Douglas L. Hunter, Lake Jackson, Tex.

[73] Assignee: The Dow Chemical Company, Midland, Mich.

[21] Appl. No.: 569,356

[22] Filed: Jan. 9, 1984

[51] Int. Cl.³ .............................................. C01G 1/04
[52] U.S. Cl. .................................................... 423/417
[58] Field of Search ......................................... 423/417

[56] References Cited

U.S. PATENT DOCUMENTS 3,282,648  11/1966  Chiusoli et al. ...................... 423/417

FOREIGN PATENT DOCUMENTS 1270925  8/1961  France ................................ 423/417

OTHER PUBLICATIONS

Hieber et al., Z. anorg. Chem., (1943), 251, 96; C.A., 37, 4643-44.
Martinengo et al., Inorg. Synth., (1980), 20, 209.
James et al., Chem. Ind., (London), 1971, 37, 1036.

*Primary Examiner*—Howard S. Williams
*Attorney, Agent, or Firm*—A. C. Ancona

[57] ABSTRACT

An improved process for making tetrarhodium dodecacarbonyl, $Rh_4(CO)_{12}$, reacts $RhCl_3 \cdot xH_2O$ with CO under about 200 psig (14.06 kg/cm²) at a temperature of about 50° C. in the presence of copper metal and an alkali metal halide, e.g. NaCl. The product mixture is contacted with a chlorinated solvent, e.g. $CH_2Cl_2$, which dissolves the desired product and is subsequently recovered by evaporating the solvent.

4 Claims, No Drawings

METHOD OF PREPARING TETRARHODIUM DODECACARBONYL

BACKGROUND OF THE INVENTION

Tetrarhodium dodecacarbonyl ($RH_4(CO)_{12}$) is a useful organometallic compound. It can be used as a catalyst or catalyst precursor in such processes as hydroformylation, hydrosilylation and carboxylation. While $Rh_4(CO)_{12}$ is a commercially available product, it is very expensive partly because of the difficulty of preparation.

A number of preparations of $Rh_4(CO)_{12}$ have been given in the literature. One is based on high pressure (3000 psig, 210.9 kg/cm$^2$) starting from $RhCl_3$ or $Rh_2(CO)_4Cl_2$; other procedures employing atmospheric pressure CO have been taught starting from $Rh_2(CO)_4Cl_2$, $K_3(RhCl_6)$ and $RhCl_3.xH_2O$. The compounds $Rh_2(CO)_4Cl_2$ and $K_3(RhCl_6)$ would not be considered good starting materials from an economic standpoint. $RhCl_3.xH_2O$ is the most readily available starting material. The literature preparations* involve the use of specially treated solvents and the use of inert atmosphere e.g. CO gas padding of the reaction mixture during the product isolation.

*Martinengo, S.; Giordano, G. and P. Chini, Inorg. Synth. 1980, 20, 209.

It would be desirable if a simpler, less complicated and less time consuming process for the preparation of the tetrarhodium dodecacarbonyl could be found.

The present invention is such a process run at low pressures, requiring less time (ca. 2 hours) and does not require specially dried, purified, or deaerated solvents or CO atmosphere handling during the product isolation.

SUMMARY OF THE INVENTION

A simpler, faster process for making tetrarhodium dodecacarbonyl, $Rh_4(CO)_{12}$, using as starting material $RhCl_3.xH_2O$ and reacting with CO under a pressure of about 200 psig, at a temperature of about 50° C. in the presence of copper metal and an alkali metal halide, e.g. NaCl. The product, $Rh_4(CO)_{12}$, is separated from the reaction mixture by dissolving in a chlorinated solvent, e.g. methylene chloride, and recovering therefrom by evaporating the solvent.

DETAILED DESCRIPTION OF THE INVENTION

The starting material, $RhCl_3.xH_2O$, is dissolved in water and placed in a reactor to which is added an alkali metal halide, e.g. NaCl, and activated copper metal. The reactor is pressured with carbon monoxide from about 25 to about 2500 psig (1.76 to 176 kg/cm$^2$), preferably from about 50 to about 500 (3.52 to 35.2 kg/cm$^2$) and heated to a temperature 25°-75° C., preferably 45° to 55° C.

The alkali metal halide and copper metal can be used, within a wide range of from sub-stoichiometric up to perhaps three times stoichiometric, but preferably in about stoichiometric quantities. Pressures above 200 psig (14.06 kg/cm$^2$) are operable but provide no advantage, but an increase from atmospheric pressure to 200 psig (14.06 kg/cm$^2$) decreases the time for reaction from 30 hours to <2 hours.

Temperatures above 75° C. cause a decrease in yield, presumably because of the formation of a different product. Temperatures below room temperature cause the reaction to be too slow.

In a representative method the reactants were charged to a 300 cc stirred autoclave with 100-150 cc $H_2O$. The autoclave was purged of air and charged to 200 psig (14.06 kg/cm$^2$) CO then heated to 40°-50° C. Samples were taken to monitor the course of the reaction. After 15 minutes, there was a faint, yellow color (due to $RhCl_3.xH_2O$) in the aqueous mixture (red $Rh_4(CO)_{12}$ had precipitated); after 30 minutes, the reaction mixture was colorless. To insure completion, the reaction was run for 1 hour. The reactor was cooled, depressurized, and the contents transferred to a beaker with deionized $H_2O$. The solid material from the reaction was collected by filtration and the filtrate discarded. The solid should be a mixture of $Rh_4(CO)_{12}$, copper, and copper salts. Changing to a clean filtration flask, the solid on the filter was washed with $CH_2Cl_2$ to dissolve the $Rh_4(CO)_{12}$ and to leave the copper. The $Rh_4(CO)_{12}$ and copper was stirred continuously until all of the $Rh_4(CO)_{12}$ was dissolved. This treatment was continued until the $CH_2Cl_2$ was colorless. The $CH_2Cl_2$ solution contained a small amount of water from washing the solid. The water was separated by transferring the liquid to a separatory funnel and adding more water to get a definitive water layer. The water layer was washed one time with more $CH_2Cl_2$. The $CH_2Cl_2$ was transferred to a round-bottom flask and the $CH_2Cl_2$ removed on a rotary evaporator. The $Rh_4(CO)_{12}$ was placed in a small bottle and stored in the freezer to retard the slow decomposition it undergoes in the air.

Results of several experiments are shown in the following Table, employing $RhCl_3.xH_2O$ as the source of rhodium.

TABLE

| Ex. | Pressure psig | Rh cpd (g) | NaCl (g) | Cu (g) | $Rh_4(CO)_{12}$ (g) | % Yield $Rh_4(CO_{12}$ |
|---|---|---|---|---|---|---|
| 1 | 200 (14.06 kg/cm$^2$) | 5 | 1.2 | 1.2 | 3.06 | 83 |
| 2 | 200 (14.06 kg/cm$^2$) | 1.3 | 0.3 | 0.3 | 0.77 | 80 |
| 3 | 1000 (70.3 kg/cm$^2$) | 2.6 | 0.6 | 1.5 | 1.48 | 77 |

The $RhCl_3.xH_2O$ was a commercially available product. The copper powder used was activated by washing it with an equal mixture of concentrated HCl and acetone and then rinsing with acetone and drying in vacuo. The water used for the reaction was degassed by boiling and sparging with $N_2$. The methylene chloride was technical grade from a 55-gallon drum and used without purification or deaerating. Contrary to other literature preparations of $Rh_4(CO)_{12}$, no precautions were taken to use a CO or inert atmosphere during the isolation of the product.

I claim

1. In a process for preparing tetrarhodium dodecacarbonyl by reacting rhodium trichloride with carbon monoxide in the presence of activated copper metal and an alkali metal halide under a pressure greater than atmospheric, the improvement which comprises conducting the reaction at a pressure of from about 50 to about 500 psig (3.52 to 35.2 kg/cm$^2$) and at a temperature of 25°-75° C. for a time of less than about two hours.

2. The process of claim 1 wherein the pressure is about 200 psig (14.06 kg/cm$^2$) and the temperature is from about 45° to about 55° C.

3. The process of claim 2 wherein the copper and alkali metal halide are used in an amount of about stoichiometric with respect to rhodium.

4. The process of claim 3 wherein the alkali metal halide is sodium chloride.

* * * * *